(12) United States Patent
Otsuka

(10) Patent No.: US 6,529,293 B1
(45) Date of Patent: Mar. 4, 2003

(54) IMAGE INFORMATION TRANSMISSION DEVICE

(75) Inventor: Shuji Otsuka, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/276,683

(22) Filed: Mar. 26, 1999

(30) Foreign Application Priority Data

Mar. 26, 1998 (JP) ............................................. 10-100062

(51) Int. Cl.⁷ ................................................. H04N 1/00
(52) U.S. Cl. ........................ 358/434; 358/407; 358/468
(58) Field of Search ................................. 358/434, 468, 358/407, 435, 436, 438, 439; 379/100.09, 100.01

(56) References Cited

U.S. PATENT DOCUMENTS 4,340,783 A    7/1982  Sugiyama et al. .......... 358/468
RE34,429 E  * 11/1993  Baran et al. ................. 358/468
5,696,600 A  * 12/1997  Perkins ....................... 358/468
6,163,600 A  * 12/2000  Miyake et al. .............. 358/468

FOREIGN PATENT DOCUMENTS

JP           A-60-9272          1/1985

OTHER PUBLICATIONS

"Specifications of F–Code Function," Communication Industry Association of Japan, Dec. 1997, pp. 1–8.

* cited by examiner

Primary Examiner—Mark Wallerson
(74) Attorney, Agent, or Firm—Oliff & Berridge, PLC

(57) ABSTRACT

In S100, a CPU detects reception of a call signal (CI signal). When the CPU detects a CNG signal (S200:YES), then in S300, the CPU execute a facsimile transmission routine for performing supply of information according to facsimile transmission procedures without providing verbal guidance. On the other hand, when no CNG signal is detected (S200:NO), then in S400, the CPU 40 executes a verbal guidance routine, and then provides information according to the verbal guidance.

14 Claims, 12 Drawing Sheets

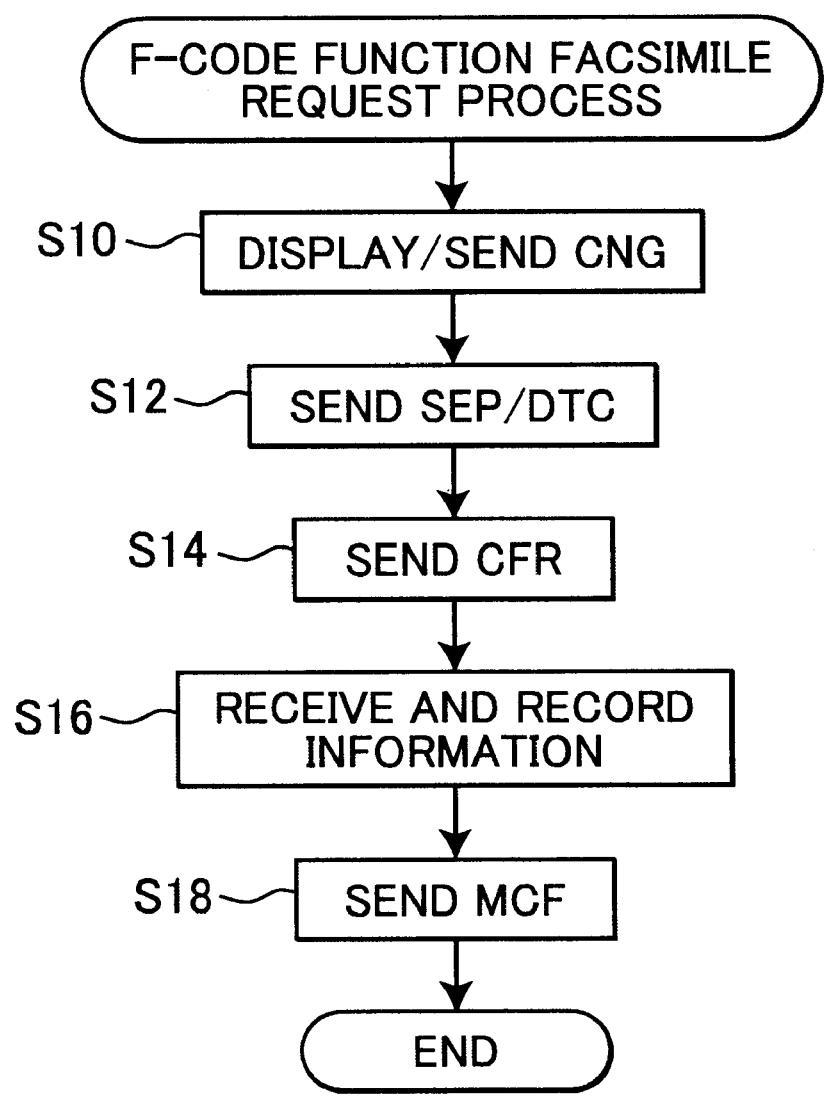

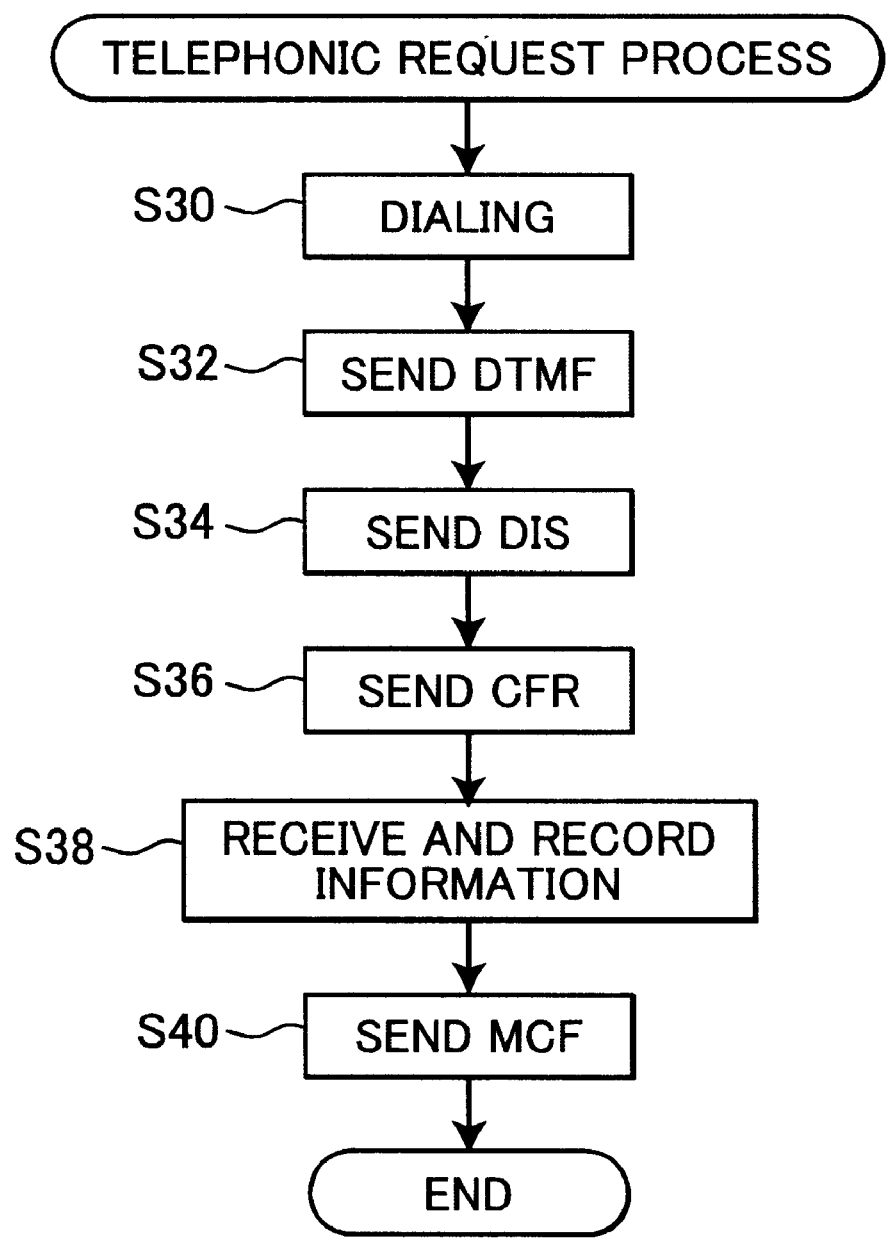

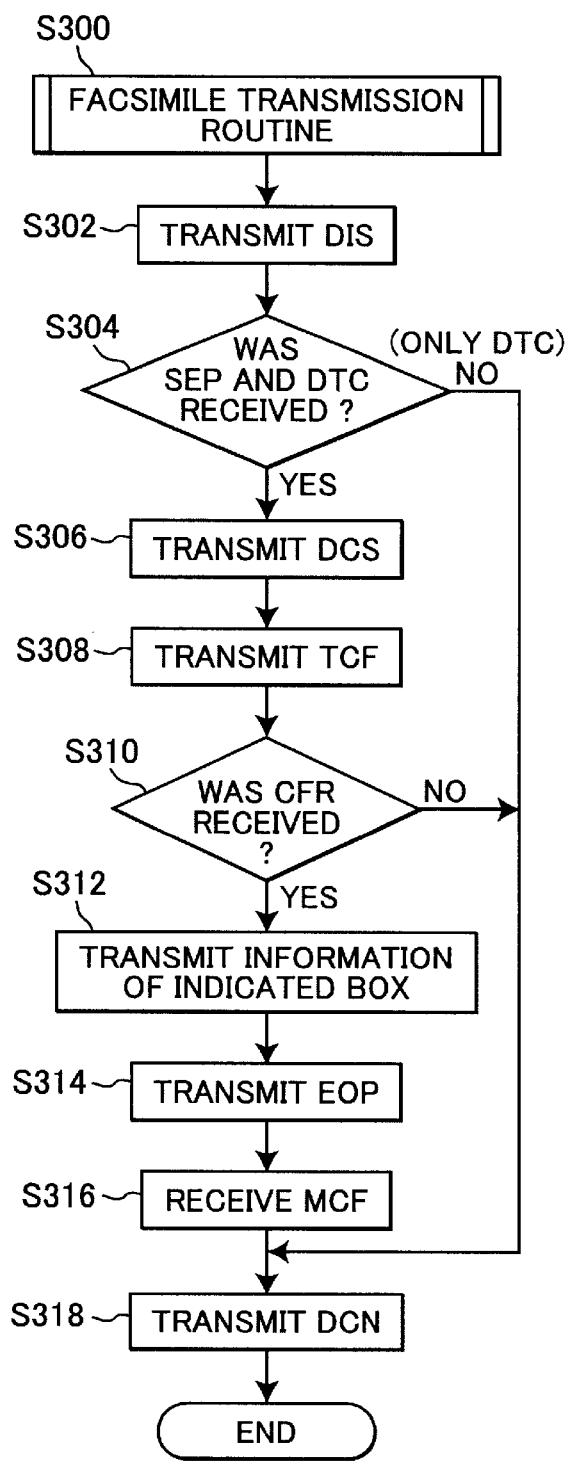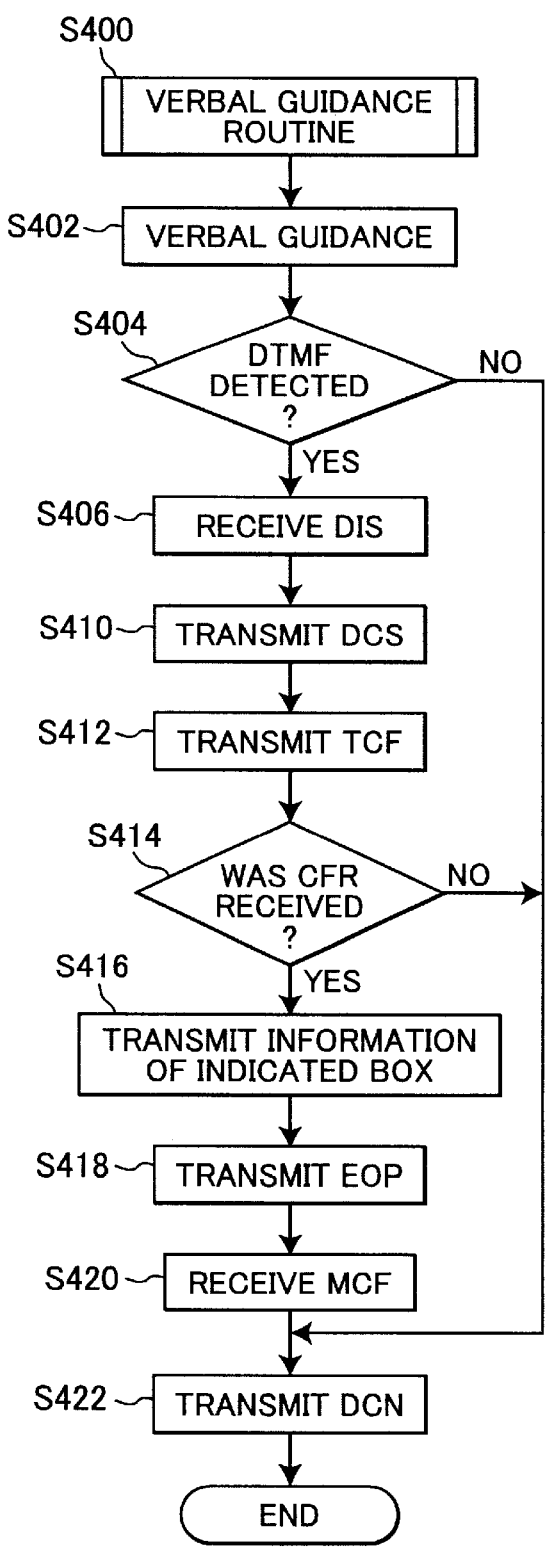

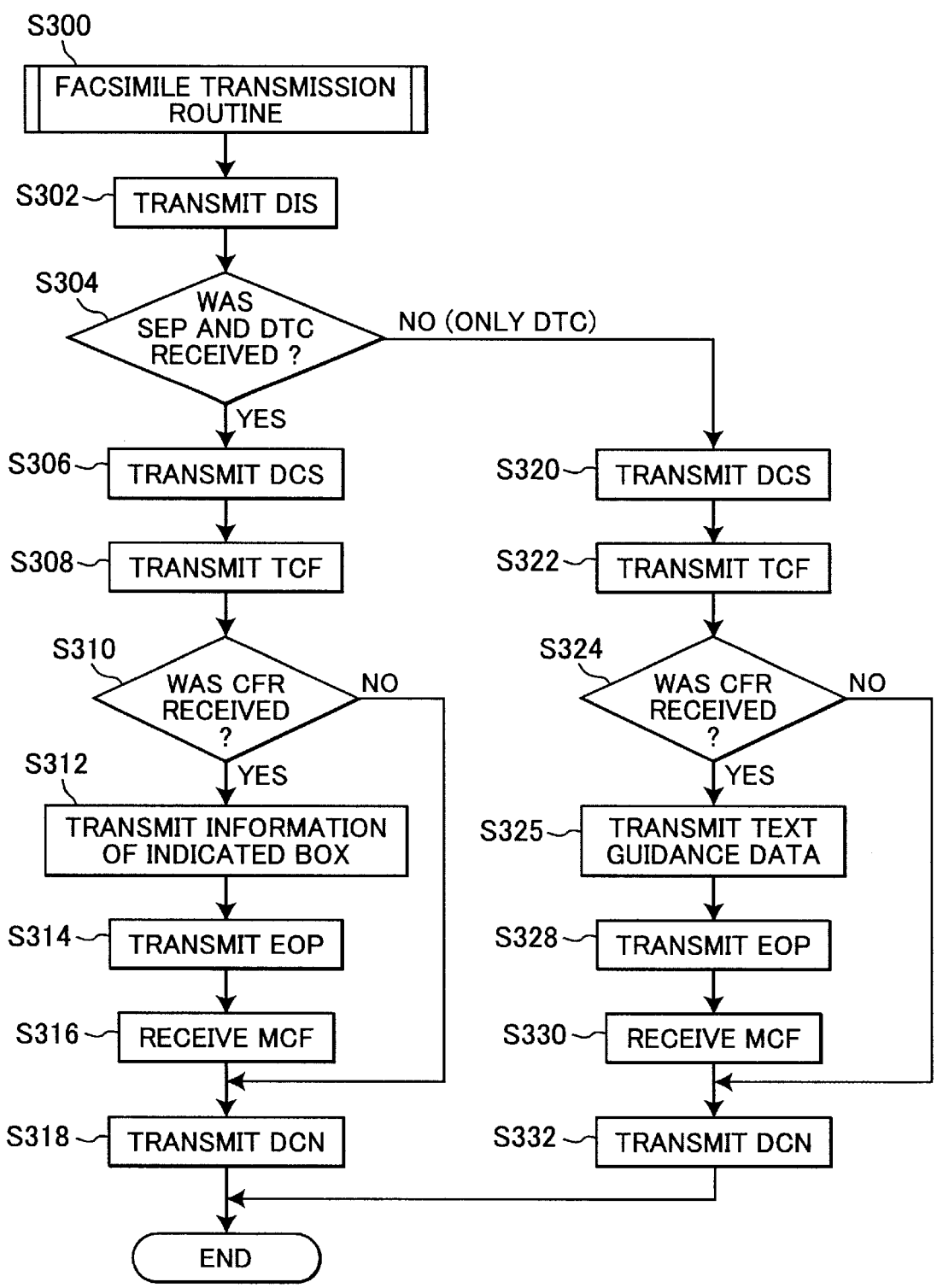

IMAGE INFORMATION TRANSMISSION DEVICE

BACKGROUND OF THE INVENTION

1. Field of the Invention

The present invention relates to an image information transmission device such as a facsimile machine for transmitting image information to remote devices.

2. Description of Related Art

There has been proposed a system, in which an information provider responds to a request from a remote user, and supplies the requested information to the remote user using a facsimile transmission procedure. For example, the remote user calls the information provider (facsimile machine) and the facsimile machine plays a verbal message indicating what numbers the user wishes to press to receive what type of information. The user, after listening to this verbal guidance, presses numbers for the information he or she wishes to receive.

SUMMARY OF THE INVENTION

In another method, the user can directly designate the number of information he or she wishes to receive without any verbal guidance. This method uses one of several facsimile transmission application functions that uses sub-address (SUB) commands and selective polling (SEP) commands according to a transmission protocol defined by ITU-T (International Telecommunications Union-T). This facsimile transmission application function will be referred to as "F(facsimile)-code function" hereinafter.

Communication Industry Association of Japan has defined a transmission format termed F-code bulletin board service that uses this F-code function. According to this F-code bulletin board service, an information provider has a memory having a plurality of boxes (memory regions), each of which stores different information. A remote user (information requester) accesses the information provide, and directly designates the box number, indicative of a desired memory, using a selective polling. (SEP) command according to a predetermined selective-polling transmission protocol. This enables the information provider to retrieve information from the designated box and transmits the information to the information requester through a facsimile transmission procedure.

According to this F-code bulletin board service, however, only facsimile machines that have a function corresponding to the selective-polling transmission procedure can access the information. Remote devices, that have no function corresponding to the selective-polling transmission procedure, may not access the information. Those remote devices can access the information only by using verbal guidance. It is, however, difficult for remote users to know whether or not he/she should use the verbal guidance.

It is therefore an objective of the present invention to provide an improved image information transmission device that can reliably provide information to a remote user (information requester) regardless of whether the information requester uses a transmission procedure that relies on verbal guidance or another transmission procedure that does not rely on verbal guidance.

In order to attain the above and other objects, the present invention provides an image information transmission device, comprising: storage means for storing image information; receiving means for receiving a request signal from a remote communication device; first judging means for judging whether the request signal is transmitted according to a facsimile communication process or according to a telephone communication process; first transmission means for, when the request signal is according to the facsimile communication process, retrieving image information, corresponding to the request signal, from the storing means and for transmitting the image information to the remote communication device; and second transmission means for, when the request signal is according to the telephone communication process, retrieving image information. corresponding to the request signal, from the storing means and for transmitting the image information to the remote communication device.

The request signal according to the facsimile communication process may include a selective polling signal indicative of desired image information, and the request signal according to the telephone communication process may include a dial signal indicative of desired image information.

The first judging means may judge whether or not the request signal includes a calling tone signal, the first judging means determining that the request signal is according to the facsimile communication process when the request signal includes a calling tone signal, the first judging means determining that the request signal is according to the telephone communication process when the request signal includes no calling tone signal.

The second translation means may include: verbal guidance means for supplying, when the first judging means determines that the request signal is according to the telephone communication process, verbal guidance information to the remote communication device, the verbal guidance information indicating a manner how to designate desired image information, thereby allowing the remote commutation device to designate the desired image information and to transmit a designation signal indicative of the designated image information: and means for retrieving image information, designated by the designation signal, from the storing means and for transmitting the retrieved image information to the remote commutation device. The designation signal may be a dial signal (DMF) indicative of the designated image information.

According to another aspect, the present invention provides a data storage medium for storing a computer program for controlling an image information transmission device, which has a, storage portion storing image information, to transmit the image information to a remote communication device in response to a request signal transmitted therefrom, the computer program comprising; a judging computer program of judging, upon receipt of a request signal transmitted from a remote communication device, whether the request signal is transmitted according to a facsimile communication process or according to a telephone communication process: a first transmission computer program of, when the request signal is according to the facsimile communication process, retrieving image information corresponding to the request signal, from the storage portion and transmitting the image information to the remote communication device; and a second transmission computer program of, when the request signal is according to the telephone communication process, retrieving image information, corresponding to the request signal, from the storage portion and transmitting the image information to the remote communication device.

BRIEF DESCRIPTION OF THE DRAWINGS

The above and other objects, features and advantages of the invention will become more apparent from reading the following description of the preferred embodiment taken in connection with the accompanying drawings in which:

FIG. 4(a) is a flowchart representing an F-code function facsimile request process executed by the remote facsimile machine 61 in order to access the facsimile machine 1 via a facsimile procedure using an F-code function;

FIG. 4(b) is a flowchart representing a telephonic request process executed by the remote facsimile machine 61 in order to access the facsimile machine 1 via a telephone procedure;

FIG. 6(a) is a flowchart representing a facsimile communication routine of S300 in FIG. 5;

FIG. 6(b) is a flowchart representing a verbal guidance routine of S400 in FIG. 5;

FIG. 10 is a flowchart representing a facsimile communication routine of S300 in FIG. 5 executed by the CPU according to the third embodiment.

DETAILED DESCRIPTION OF THE PREFERRED EMBODIMENTS

Figure 1:
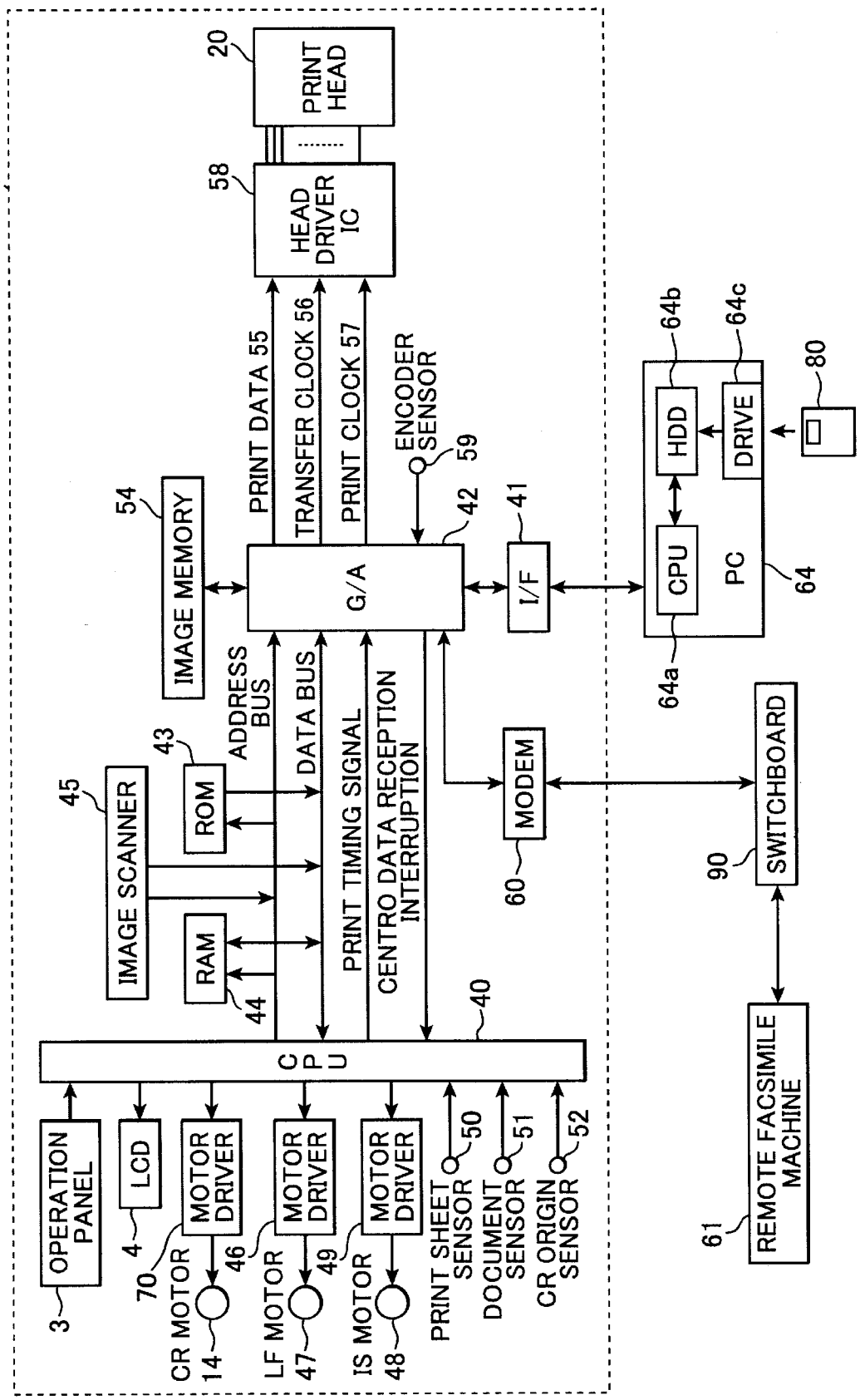
FIG. 1 is a block diagram showing a main control system of a facsimile machine 1 according to a first embodiment of the present invention.

An information transmission device according to preferred embodiments of the present invention will be described while referring to the accompanying drawings wherein like parts and components are designated by the same reference numerals to avoid duplicating description.
<First Embodiment>

An information transmission device of a first embodiment of the present invention will be described below with reference to FIGS. 1, 2(a), and 3(a) through 6(b).

The information transmission device 1 of the present embodiment is a facsimile machine, and can be connected to remote facsimile machines via a switchboard 90 through a telephone circuit. The facsimile machine 1 serves as an information providing device for providing information to a remote facsimile machine 61, for example, upon receipt of a request received from the remote facsimile machine 61. The facsimile machine 1 can also serve as a normal facsimile machine for performing normal facsimile transmission/ reception operation.

As shown in FIG. 1, the facsimile machine 1 is connected to a personal computer 64 via an interface (I/F) 41. The facsimile machine 1 can receive, from the personal computer 64, print data desired to be printed by the facsimile machine 1.

As shown in FIG. 1, the facsimile device 1 includes: a recording head 20, an image scanner 45, a communication modem 60, and a gate array 42. The recording head 20 in for recording incoming facsimile data received from remote facsimile machines via the telephone circuit and for recording print data inputted from the personal computer 64. The image scanner 45 is for scanning a document, mounted thereon, to produce outgoing facsimile data. The communication modem 60 is for modulating outgoing facsimile data and transmitting the modulated data to the telephone circuit and for receiving incoming facsimile data from the telephone circuit and for demodulating the received data. The gate array 42 is for developing incoming facsimile data received and demodulated by the communication modem 60 and for developing print data inputted from the personal computer 64 via the interface 41.

The facsimile machine 1 includes a CFU 40 for controlling the entire facsimile machine 1 by performing a variety of different controls, such as a retrieval control for retrieving image information from a document using the image scanner 45, a recording control for recording incoming facsimile data and print data onto a recording sheet using the recording head 20, an input/output control for inputting and outputting data from and to the personal computer 64, and a communication control such as a normal facsimile transmission/ reception control for transmitting/receiving facsimile data and an information transmission control for transmitting facsimile information to a remote facsimile machine 61, for example, in response to a request received from the remote facsimile machine 61.

Figure 5:
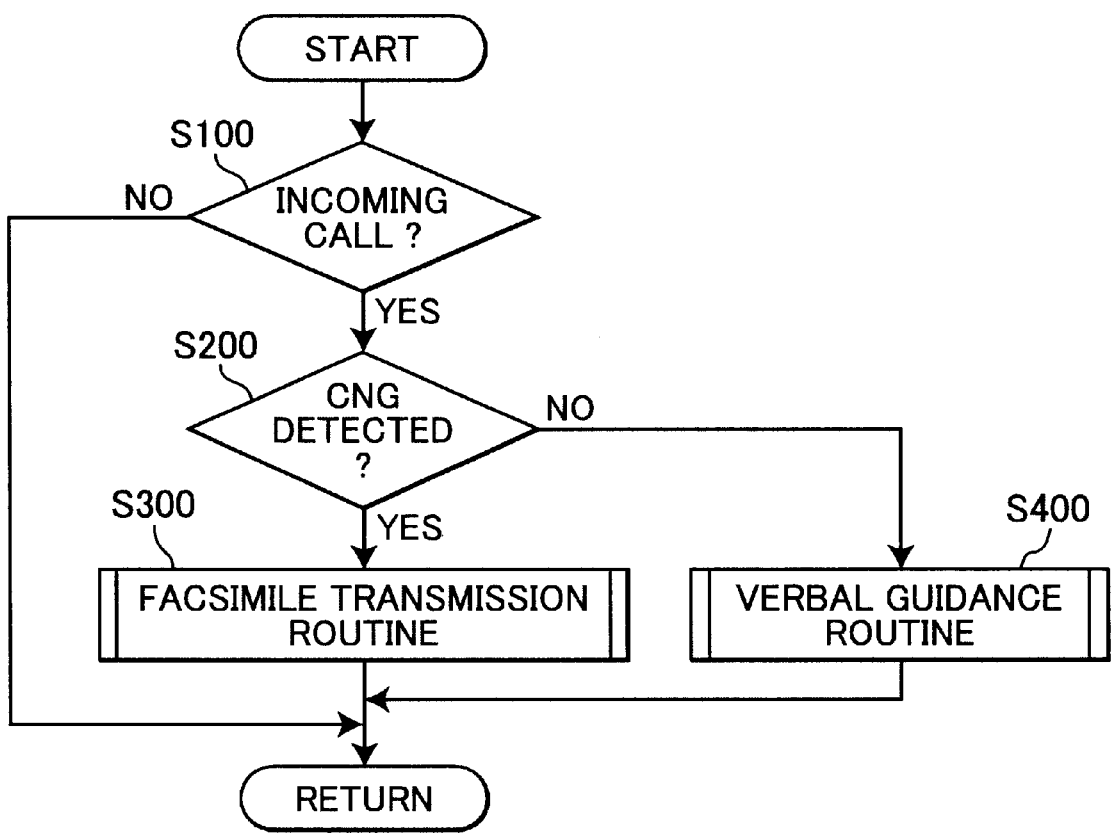
FIG. 5 is a main flowchart representing an information transmission control executed by a CPU 40 of the facsimile machine 1 according to the first embodiment.

The CPU, 40 and the gate array 42 are connected by an address bus and a data bus. A ROM 43 and a RAM 44 are connected to the address bus and the data bus. The ROM 43 stores therein control programs to be executed by the CPU 40 to perform the above-described variety of controls. For example, the ROM 43 stores therein an information transmission control program whose flowchart is shown in FIGS. 5–6. In order to allow the CPU 40 to execute the control programs, the control programs are first retrieved from the ROM 43 and are temporarily stored in the RAM 44. The CPU 40 also performs input/output operation for transferring necessary data between the ROM 43 and the RAM 44. The ROM 43 also serves to store facsimile number(s) of one or more remote facsimile machines, to which facsimile data is to be transmitted during a normal facsimile transmission operation.

The RAM 44 serves to store a plurality of sets of information to be provided to the remote facsimile machine 61, for example, in response to a request transmitted therefrom.

Figure 2A:
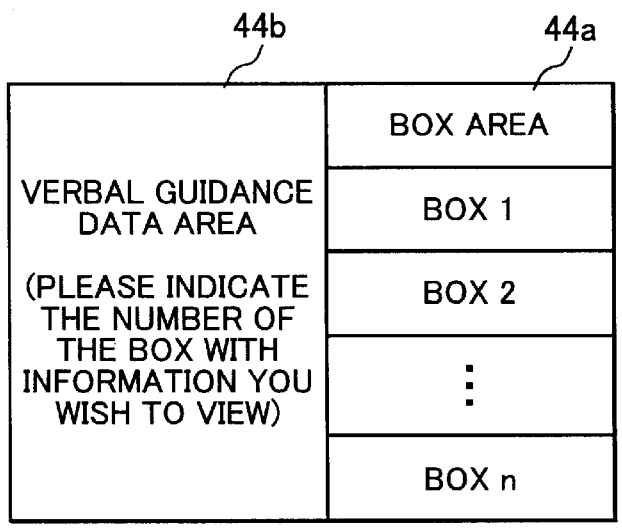
FIG. 2(a) is a schematic view showing a memory content of a RAM 44 in the facsimile machine 1 according to the first embodiment.

As shown in FIG. 2(a), the RAM 44 has two memory areas: a box area 44a and a voice guidance data area 44b.

The box area 44a is configured from a total of "n" boxes "BOX1" to "BOXn" where "n" is an integer greater than one (1). Each box stores a corresponding set of image information. For example, if the facsimile machine 1 is used for providing information related to taxes, explanations relating to several different aspects of taxes, for example, income tax and tax deductions are prepared as a plurality of sets of image information. The plural sets of image information are stored in the respective boxes "BOX1" to "BOXn". Thus, the box area 44a stores, as each box "Boxi" (where "i" is an integer; $1 \leq 1 \leq n$), a corresponding set of information together with data of a corresponding box number "i".

The voice guidance data area 44b stores a set of verbal guidance data. The verbal guidance data represents information for verbally explaining how a remote user can retrieve information from the box area 44a when the remote user uses the remote facsimile machine 61 to telephone the facsimile machine 1 rather than by contacting the facsimile machine 1 using facsimile communication. An example of the verbal guidance data would be data representing a message saying "please indicate the number of the box for the information you wish to view."

The gate array 42 is connected to an image memory 54 and an encoder sensor 59. The image memory 54 is for temporarily storing, as image data 55, a variety of received data (incoming facsimile data and print data supplied from the personal computer 64). The encoder sensor 59 is for measuring a moving speed of a carriage (not shown), on which the recording head 20 is mounted, and for determining recording timing. The gate array 42 generates a recording clock 57 based on a signal outputted from the encoder sensor 59 in association with the movement of the carriage. The gate array 42 also generates a transfer clock 56. A head driver IC 58 is connected to the gate array 42. The head driver IC 58 is for receiving image data 55, the recording clock 57, and the transfer clock 56 from the gate array 42. The head driver IC 58 drives the recording head 20 based on the image data 55, the recording clock 57, and the transfer clock 56.

The CPU 40 1s connected with: a recording sheet sensor 50; a document sensor 51; a carriage origin sensor 52; a first motor driver 70 for driving a carriage motor 14 to move the carriage; a second motor driver 46 for driving a line feed motor 47 for rotating a platen roller (not shown) to feed a recording sheet; a third motor driver 49 for driving an image scanner motor 48 of the image scanner 45; an operation panel 3; and a liquid crystal display device 4.

The recording sheet sensor 50 is for detecting presence or absence of a recording sheet. The document sensor 51 is for detecting whether a document is set in an image retrieval portion of the image scanner 45. The carriage origin sensor 52 is for detecting whether the carriage is in its home position. The operation panel 3 is for enabling a user to input a variety of input signals into the CPU 40. Although not shown in the drawing, the facsimile machine 1 is further provided with a handset.

With the above-described structure, the CPU 40 of the facsimile machine 1 executes an information transmission control shown in FIG. 5 when a remote facsimile machine 61, for example, accesses the facsimile machine 1. During the information transmission control, the CPU 40 executes a facsimile communication routine of S300 shown in FIG. 6(a) when the remote device 61 accesses the facsimile machine 1 via a facsimile communication process. The CPU 40 executes a verbal guidance routine of S400 in FIG. 6(b) when the remote device 61 accesses the facsimile machine 1 via a telephone communication process.

Figure 3A:
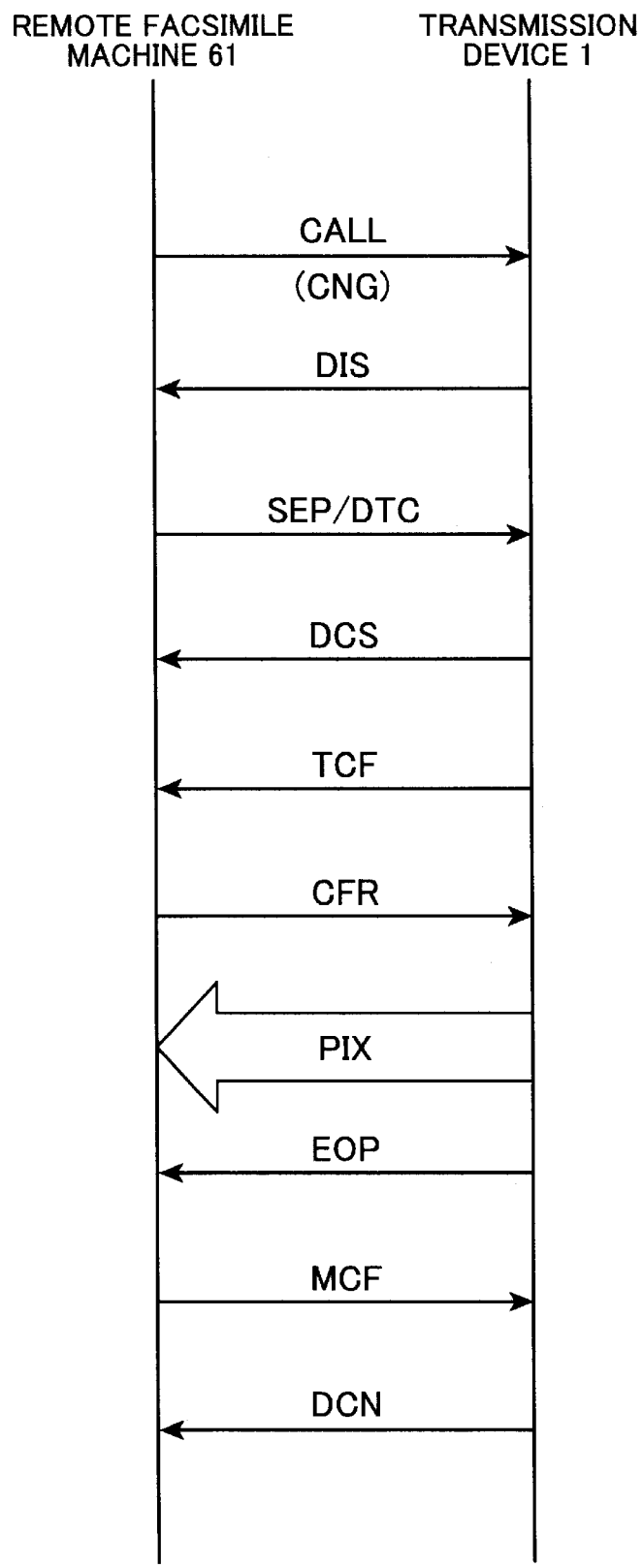
FIG. 3(a) is a schematic view showing transmission procedures performed between the facsimile machine 1 and a remote facsimile machine 61 when the remote facsimile machine 61 accesses the facsimile machine 1 via a facsimile transmission procedure according to the first embodiment.
Figure 3B:
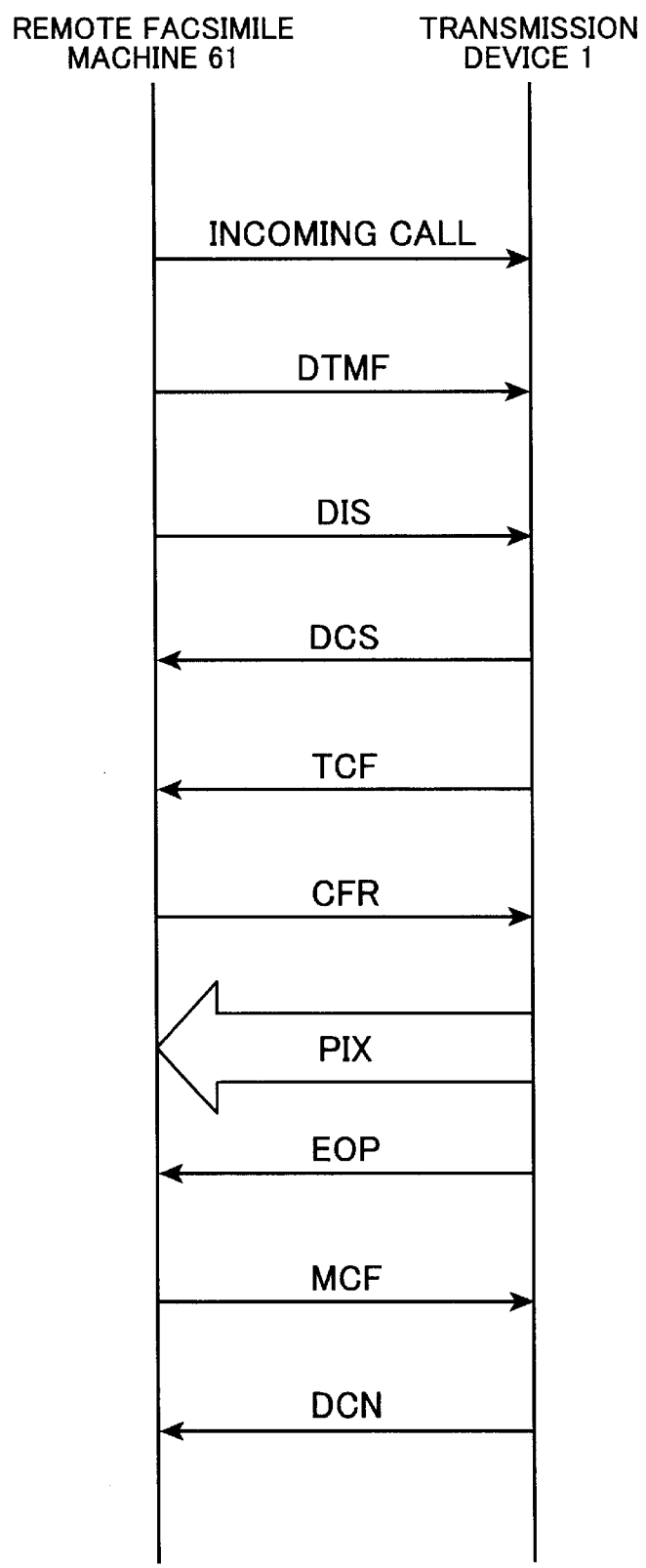
FIG. 3(b) is a schematic view showing transmission procedures performed between the facsimile machine 1 and the remote facsimile machine 61 when the remote facsimile machine 61 accesses the facsimile machine 1 via a telephone call according to the first embodiment.

According to the information transmission control executed by the facsimile machine 1, communication is performed between the remote facsimile machine 61 and the present facsimile machine 1 as shown in FIG. 3(a) when the remote facsimile machine 61 accesses the facsimile machine 1 via a facsimile communication process. Communication is performed between the remote facsimile machine 61 and the present facsimile machine 1 as shown in FIG. 3(b) when the remote facsimile machine 61 accesses the facsimile machine 1 via a telephone communication process.

The information transmission operations executed by the CPU 40 of the facsimile machine 1 will be described below in greater detail while referring to FIGS. 3(a), 4(a), 5, and 6(a).

In this example, it is assumed that the remote facsimile machine 61 is provided with the F-code function and therefore can perform an F-code function facsimile request process as shown in FIG. 4(a). More specifically, the facsimile machine 61 has the same structure as that of the present facsimile machine 1 except for the points described below. That is, the RAM 44 of the remote facsimile machine 61 has no box area 44a or no verbal guidance data area 44b, and the ROM 43 stores a program for the F-code function facsimile request process of FIG. 4(a) and a program for a telephonic request process of FIG. 4(b).

It is also assumed that the user of the remote facsimile machine 61 has a box number list that shows, using short phrases, brief descriptions of the contents of the boxes "BOX1"–"BOXn" in the facsimile machine 1. The remote user can therefore operate the facsimile machine 61 to designate a box number "i" of an information box "BOXi", from which the user desires to retrieve information. In response to the user's operation, the remote facsimile machine 61 can directly indicate the user's designated box number using a selective polling (SEP) command according to the predetermined selective-polling transmission protocol.

More specifically, when the user at the remote facsimile machine 61 desires to retrieve information from some information box "BOXi (where $1 \leq i \leq n$)" of the facsimile machine 1, the remote user first manipulates the operation panel 3 provided to the facsimile machine 61 and sets the facsimile machine 61 into a predetermined F-code function information retrieving mode. As a result, the F-code function facsimile request process of FIG. 4(a) is executed. First, the liquid crystal display 4, also provided to the facsimile machine 61, is controlled in S10 to display a guidance message reading "Please enter the box number of the information box with information you wish to view." Viewing this message, the remote user inputs his/her desired box number "i" (where $1 \leq i \leq n$) through manipulating a numeric pad provided to the operation panel 3. When the facsimile machine 61 detects the input of the box number "i", the remote facsimile machine 61 transmits, to the switchboard 90, a dial signal indicative of the facsimile number of the present facsimile machine 1 so that the telephone circuit be connected between the remote facsimile machine 61 and the facsimile machine 1. The facsimile machine 61 also transmits a CNG signal (calling tone signal) indicating that the present calling is according to a facsimile procedure. As a result, the switchboard 90 will transmit a CI (call indicating) signal and the CNG signal to the facsimile machine 1. Thereafter, upon receipt of a DIS (digital identification signal) from the facsimile machine 1, the remote facsimile machine 61 transmits in S12, to the present facsimile machine 1, a selective polling (SEP) command indicative of the user's designated box number "i" together with a DTC (digital transmit command) signal indicative of a response to the DIS signal. Then, after receiving a DCS signal (digital command signal) and a TCF (training check) signal from the facsimile machine 1, the facsimile machine 61 sends a CFR (confirmation to receive) signal in S14 when the facsimile machine 61 completes its reception preparation. Then, in S16, as will be described later, the facsimile machine 61 will receive image information sent from the user's desired information box "BOXi" of the facsimile machine 1. The facsimile machine 61 perform a recording operation to record the received image information on a recording sheet. After completing the recording operation, when receiving an EOP (end of procedures) signal from the facsimile machine 1, the facsimile machine 61 sends an MCF (message confirmation) signal to the facsimile machine 1 in S18, and this process ends.

In correspondence with the above-described image retrieval requesting operation of the remote device 61, the present facsimile machine 1 operates as described below.

As shown in FIG. 5, the CPU 40 waits for incoming call signals (CI signals) from the telephone circuit (no in S100). When the CPU 40 detects reception of a call signal (CI signal) (yes in S100), the CPU 40 further judges in S200 whether or not a CNG (calling tone) signal is detected. When a CNG signal is detected (S200:YES), then the CPU 40 executes a facsimile communication routine in S300. Because the remote facsimile machine 61 transmits a CNG signal (S10) in this case, the facsimile communication routine of S300 is executed.

During the facsimile communication routine of S300, as shown in FIG. 6(a), the CPU 40 first transmits in S302 a DIS signal (digital identification signal) to the remote facsimile machine 61. The DIS signal informs the remote facsimile machine 61 of the transmission capability of the present facsimile machine 1. Next in S304, the CPU 40 judges whether or not a SEP signal and a DTC signal have been received from the remote facsimile machine 61.

Because the remote facsimile machine 61 transmits a SEP command to designate the box number in this example, the CPU 40 detects reception of a SEP signal (S304:YES), and the program proceeds to S306. The CPU 40 temporarily stores, in the RAW 44, box number data indicated by the SEP signal.

Then, in S306, the CPU 40 transmits a DCS signal (digital command signal) to the remote facsimile machine 61 to instruct the remote facsimile machine 61 to receive image information in a particular mode. Then in S308, the CPU 40 transmits a TCF signal (training check signal) to the remote facsimile machine 61 to confirm the communication speed set in the remote facsimile machine 61.

When the CPU 40 detects reception of a CFR signal (confirmation to receive signal) indicating that reception preparation has been completed at the remote facsimile machine 61 (S310:YES), then in S312, the CPU 40 retrieves the box number data that is temporarily stored in the RAM 44, retrieves image information (PIX) from a box "BOXi" ($1 \leq i \leq n$) indicated by the retrieved box number data, and transmits the retrieved image information (PIX) to the remote facsimile machine 61. The remote facsimile machine 61 will record in S16 the received information on a recording sheet. The user of the remote facsimile machine 61 will know the contents of the information by viewing the recorded sheet.

When completing the transmission of the image information, the CPU 40 transmits in S314 an EOP signal (end of procedures signal) indicating that the facsimile transmission procedure is being completed. When the CPU 40 receives from the remote device 61 an NCF signal (message confirmation signal) that is a positive response to the EOP signal in S316, then in S318, the CPU 40 transmits a DCN signal (disconnect signal) instructing termination of the connection between the facsimile machines 1 and 61.

On the other hand, when the CPU 40 judges that no SEP signal has been received (S304:NO), or judges that no CFR signal has been received (S310:NO), then the CPU 40 immediately transmits a DCN signal in S318, thereby terminating the communication.

Thus, the facsimile machine 1 of the present embodiment can provide information corresponding to the user's designated box number when the remote facsimile machine 61 designates the box number using its own F-code function.

Next, with reference to FIGS. 3(b), 4(b), 5, and 6(b), an explanation will be provided for processes that are executed by the facsimile machine 1 when the user of the remote facsimile machine 61 calls the present facsimile machine 1 using a handset provided to the remote facsimile machine 61.

It is assumed that the remote facsimile machine 61 has the F-code function, but the user of the remote facsimile machine 61 does not have a box list showing the box numbers, or does not know how to access the present facsimile machine 1 using the F-code function. Accordingly, the user does not set the facsimile machine 61 into the F-code function information retrieving mode. The user simply manipulates the handset of the remote facsimile machine 61 to call the present facsimile machine 1 (S30 in FIG. 4(b)). As a result, the telephonic request process of FIG. 4(b) is executed. More specifically, the facsimile machine 61 first transmits a dial signal indicative of the facsimile number of the present facsimile machine 1 so that the telephone circuit be connected between the facsimile machine 61 and the facsimile machine 1. As a result, the switchboard 90 will transmit a CI (call indication) signal to the facsimile machine 1. In this case, no CNG signal is transmitted from the remote facsimile machine 61 to the facsimile machine 1. Accordingly, the CPU 40 of the facsimile machine 1 detects no CNG signal (yes in S100 and no in S200 of FIG. 5), and so executes verbal guidance routine in S400 (FIG. 6(b)).

During the verbal guidance routine of S400, the facsimile machine 1 performs a verbal guidance operation to verbally inform the remote user how to select his/her desired box number. Listening to the verbal guidance, the remote user selects his/her desired box number "i" through pushing one or more push button(s) provided to the handset of the remote facsimile machine 61. In response to the user's operation of the push button(s), the remote facsimile machine 61 sends in S32 dial signals (DTMF signals) indicative of the user's designated box number "i" to the facsimile machine 1. The remote user then pushes a start button, also provided to the facsimile machine 61, so that the facsimile machine 61 can receive image information from the facsimile machine 1. In response to the user's operation on the start button, the remote facsimile machine 61 transmits in S34 a DIS (digital identification signal) to the present facsimile machine 1. The DIS signal informs the facsimile machine 1 of the communication capability of the remote facsimile machine 61. Then, after receiving a DCS signal and a TCF signal from the facsimile machine 1, the facsimile machine 61 sends in S36 a CFR signal when completing its reception preparation. Then, in S38, the facsimile machine 61 will receive image information sent from the user's designated information box "BOXi" of the facsimile machine 1. The facsimile machine 61 performs a recording operation to record the received image information on a recording sheet. After completing the recording operation, when receiving an EOP signal from the facsimile machine 1, the facsimile machine 61 sends an MCF signal to the facsimile machine 1 in S40, and this process ends.

In correspondence with the above-described operation of the remote facsimile machine 61, the present facsimile machine 1 executes the verbal guidance routine of S400 as described below.

First, as shown in FIG. 6(b), the CPU 40 retrieves in S402 verbal guidance data from the verbal guidance data area 44b and performs verbal guidance by converting the verbal guidance data into sound and playing the sound. More specifically, in S402, the CPU 40 plays a verbal guidance such as a message saying "please indicate the number of the box with information you wish to view." As described already, after listening to this verbal message, the user of the remote facsimile machine 61 designates the box number "i" by pressing push buttons provided to the handset. As a result, DTMF (dual tone multi-frequency) signals are transmitted in S32 (FIG. 4(b)) to the facsimile machine 1. When the CPU 40 detects the DTMF signals (S404:YES), the program proceeds to S406. The box number data indicated by the DTMF signals is temporarily stored in the RAM 44.

As also described already, the remote user then presses the start button of the remote facsimile machine 61. A DIS signal is therefore transmitted in s34 (FIG. 4(b)) from the remote facsimile machine 61 to the facsimile machine 1. When the CPU 40 of the facsimile machine 1 detects receipt of the DIS signal in S406, the CPU 40 transmits a DCS signal in S410 and a TCP signal in S412. When the CPU 40 receives a CFR signal from the remote facsimile machine 61 (S414:YES), than in S416, the CPU 40 retrieves the box number data that is temporarily being stored in the RAM 44, retrieves image information (PUX) from a box "BOXi" ($1 \leq i \leq n$) indicated by the retrieved box number data, and transmits the retrieved image information to the remote facsimile machine 61. The remote facsimile machine 61 will record in S38 the received image information onto a recording sheet. The user of the remote facsimile machine 61 will view the recorded sheet and understand the contents of the information.

When completing the information transmission, in S418, the CPU 40 transmits an EOP signal indicating completion of the information transmission. When an MCF signal is received from the remote facsimile machine 61 in S420, the CPU 40 transmits a DCN signal in S422, thereby terminating the connection with the remote facsimile machine 61.

On the other hand. when the CPU 40 judges that no DTMF signal has been received (S404:NO) or that no CFR signal has been received (S414:NO), then the CPU 40 immediately transmits a DCN signal (S422), thereby terminating the communication.

In the above description, the remote facsimile machine 61 has the F-code function. However, even if the remote facsimile machine 61 has no F-code function, the remote facsimile machine 61 can access the present facsimile machine 1 via the telephone communication of FIG. 4(b). In response to this telephonic access, the present facsimile machine 1 executes the verbal guidance routine of FIG. 6(b), thereby providing the remote user's designated information to the remote facsimile machine 1.

As described above, according to the present embodiment, in S100, the CPU 40 detects reception of an incoming call signal (CI signal). When the CPU 40 detects a CNG signal (S200:YES), then in S300, the CPU 40 execute the facsimile transmission routine for performing supply of information according to facsimile transmission procedures without providing verbal guidance. On the other hand, when no CNG signal is detected (S200:NO), then in S400, the CPU 40 executes a verbal guidance routine, and then provides information according to the verbal guidance.

Thus, even when the user of the remote facsimile machine 61 accesses the facsimile machine 1 using the handset provided to the remote facsimile machine 61, the present facsimile machine 1 can enable the user to access the user's desired information by verbally explaining how to retrieve the information.

The facsimile machine 1 can thus supply image information to the remote device 61 regardless of whether the remote device 61 requests information transmission according to facsimile communication or telephonic communication. Even when the remote device 61 is incapable of requesting the present facsimile machine 1 according to the facsimile communication procedure, the remote device 61 can perform a dialing operation to transmit a DTMF signal indicative of desired image information. In response to the DTMF signal, the present facsimile machine 1 retrieves image information designated by the DTMF signal and transmits the retrieved image information to the remote device 61.

Even when the remote user at the remote device 61 does not know that he/she can designate image information by dialing operation, the facsimile machine 1 can verbally inform the remote device 61 of the manner how to designate the user's desired image information. Listening to the verbal guidance information, the remote user can designate his/her desired information on the remote device 61, which then transmits the DTMF signal to request the facsimile machine 1 to provide the designated information to the remote device 61.

<Second Embodiment>

Next, a facsimile machine 1 according to a second embodiment of the present invention will be described while referring to FIGS. 2(b), 7, 8, and 9.

The facsimile machine 1 according to the second embodiment is capable of informing the remote facsimile machine 61 what information is stored in which box area without occurring a communication error when the remote facsimile machine 61 attempts to designate the box number without using its own F-code function.

Figure 2B:
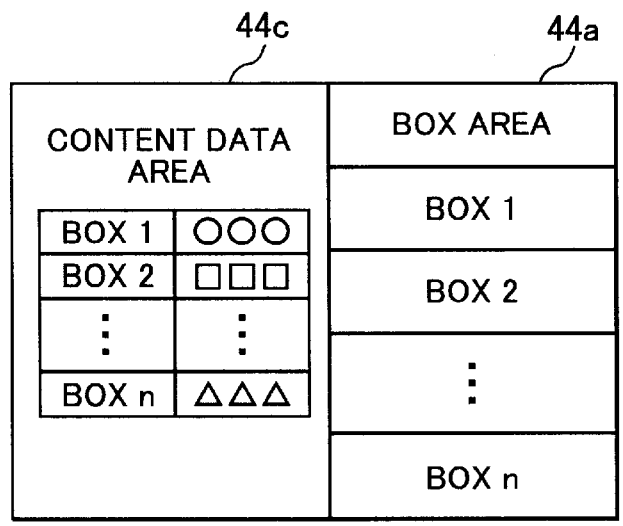
FIG. 2(b) is a schematic view showing a memory content of the RAM 44 according to a second embodiment.
Figure 9:
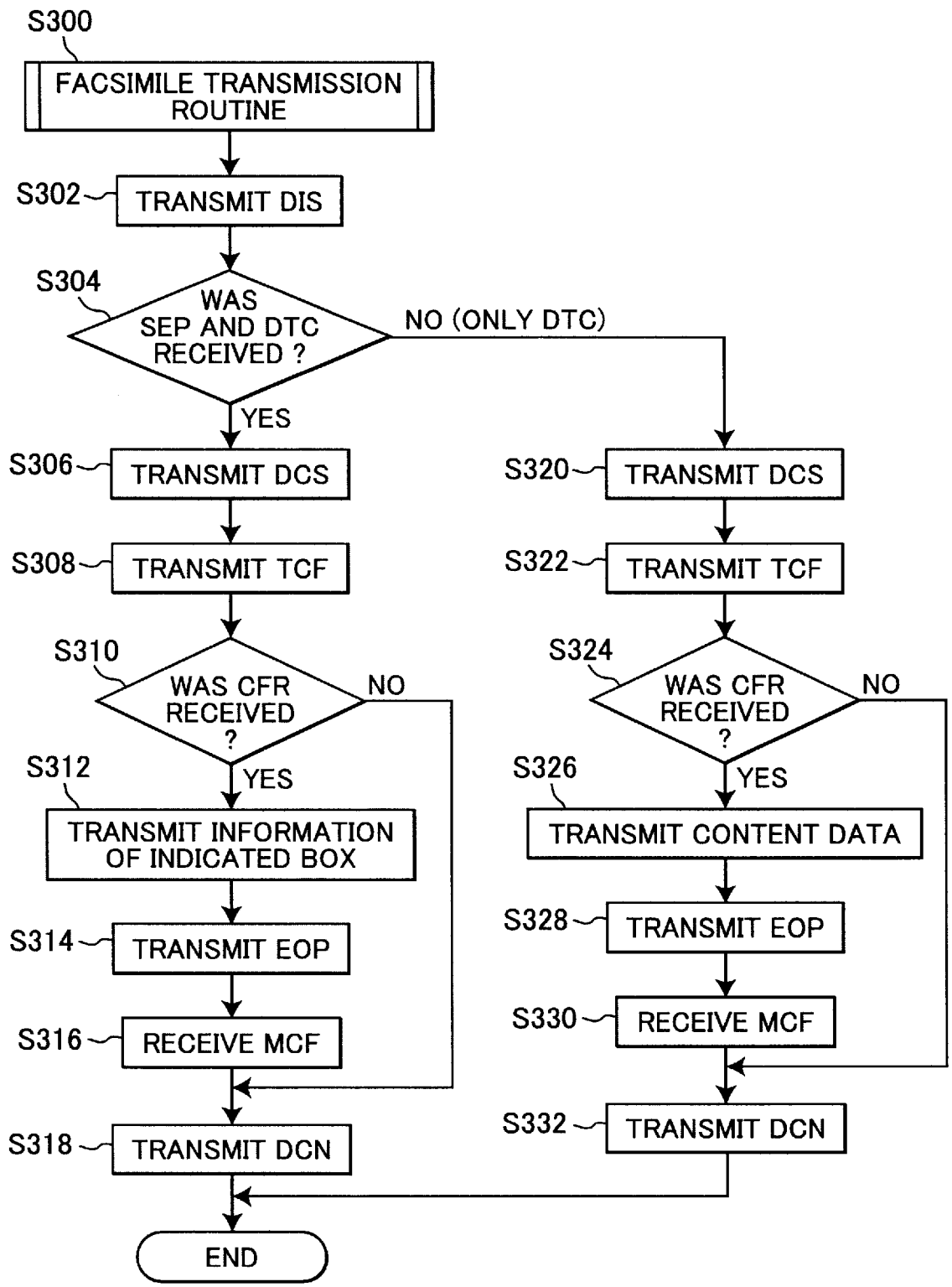
FIG. 9 is a flowchart representing the facsimile communication routine of S300 in FIG. 5 executed by the CPU 40 according to the second embodiment.

The facsimile machine 1 according to the second embodiment is the same as that of the facsimile machine 1 of the first embodiment except that the RAM 44 has a memory content shown in FIG. 2(b) and that the facsimile machine 1 executes the facsimile communication routine of S300 as shown in FIG. 9. The facsimile communication routine of S300 of the present embodiment is the same as that of the first embodiment (FIG. 6(a)) except that processes of S320–S332 are added.

As shown in FIG. 2(b), the RAM 44 has two memory areas: a box area 44a and a content data area 44c. The box area 44a has the same configuration as described in the first embodiment. The content data area 44c stores content data (list data) indicating, using short phrases, the content of information stored in each box of the box area 44a. FIG. 2(b) shows examples of content data. In these examples, content data indicates, in a table form, a title of information stored in each box. For example, BOX1 is ○○○. and BOX2 is □□□.

Next, the facsimile communication routine of S300 executed by the CPU 40 will be explained while referring to FIGS. 7–9.

It is assumed that the remote facsimile machine 61 has the F-code function. The user of the remote facsimile machine 61, however, does not have the box number list, and therefore does not know the contents of the information boxes of the facsimile machine 1. The user of the remote facsimile machine 61 therefore attempts to access the present facsimile machine 1 using a normal-polling facsimile procedure with using DTC commands but not using SEP commands.

That is, in this case, the user of the remote facsimile machine 61 first manipulates the operation panel 3 of the remote facsimile machine 61 to set the facsimile machine 61 into a polling transmission function mode. As a result, as shown in FIGS. 7 and 8, the remote facsimile machine 61 first transmits in S50 a dial signal indicative of the facsimile number of the facsimile machine 1 so that the telephone circuit be connected between the remote facsimile machine 61 and the facsimile machine 1. The remote facsimile machine 61 also transmits a CNG signal indicating that this calling is according to a facsimile procedure. As a result, the switchboard 90 will transmit a CI (call indicating) signal and the CNG signal to the facsimile machine 1. Thereafter, upon receipt of a DIS (digital identification signal) from the facsimile machine 1, the remote facsimile machine 61 transmits in S52, to the present facsimile machine 1, only a DTC (digital transmit command) signal indicative of a response to the DIS signal. Then, after receiving a DCS signal and a TCF signal from the facsimile machine 1, the facsimile machine 61 sands in S54 a CFR signal when completing its reception preparation. Then, in S56, as will be described later, the facsimile machine 61 will receive box content information sent from the content data area 44c of the facsimile machine 1. The facsimile machine 61 performs a recording operation to record the received content information on a recording sheet. After completing the recording operation, when receiving an EOP signal from the facsimile machine 1, the facsimile machine 61 sends an MCF signal to the facsimile machine 1 in S58, and this process ends.

In response to the above-described operation of the remote facsimile machine 61, the present facsimile machine 1 operates as described below.

Because the remote facsimile machine 61 accesses the present facsimile machine 1 via facsimile communication, the present facsimile machine 1 receives a CNG signal indicating that this calling is according to a facsimile procedure (yes in S100 and S200 of FIG. 5). Accordingly, the facsimile machine 1 performs the facsimile communication routine of S300 am shown in FIG. 9. Because the remote facsimile machine 61 executes the normal polling procedure, the remote facsimile machine 61 does not use SEP commands in S52. Accordingly, the CPU 40 receives only a DTC signal in S304. Therefore, in S304, the CPU 40 will judge that no SEP signal has been received (S304:NO), and the program proceeds to S320. The CPU 40 then transmits a DCS signal in S320 and a TCF signal in S322. When the CPU 40 receives a CFR signal (S324:YES), the CPU 40 retrieves content data from the content data area 44c of the RAM 44, and transmits the retrieved content data to the remote facsimile machine 61 in S326. The remote facsimile machine 61 will record in S56 the transmitted information onto a recording sheet. The user of the remote facsimile machine 61 views the recorded sheet to know what information is stored in what box number area of the box area 44a of the facsimile machine 1.

When completing the content data transmission, the CPU 40 transmits in S328 an EOP signal indicating that transmission of content data is completed. When the CPU 40 receives an MCF signal from the facsimile machine 61 in S330, then the CPU 40 transmits a DCN signal in S332.

Thus, the facsimile machine 1 according to the second embodiment can advise the user of the remote facsimile machine 61 about contents of the box area 44a. After knowing the contents in the box area 44a, the user of the remote facsimile machine 61 will access the present facsimile machine 1 using the F-code function to designate his/her desired box number "i" using a SEP command in the same manner as described in the first embodiment. In response to this operation of the remote facsimile machine 61, the CPU 40 in the present facsimile machine 1 executes the processes of S100, S200, and S300, in which the CPU 40 executes the processes of S302–S318 in the same manner as in the first embodiment. This enables the user of the remote facsimile machine 61 to obtain his/her desired information.

As described above, according to the present embodiment, when the remote device 61 does not properly designate image information desired to be transmitted, the facsimile machine 1 transmits information indicative of the contents of the information boxes to the remote device 61. Accordingly, even when the remote user does not know the contents of the information boxes, the facsimile machine 1 can inform the remote device 61 of the contents of the information boxes. Knowing the contents of the storage, the user at the remote device 61 can designate his/her desired image information to let the facsimile machine 1 provide the image information to the remote device 61.

In the above description, the remote facsimile machine 61 is assumed to have the F-code function. However, the remote facsimile machine 61 may not have the F-code function. Even when the remote facsimile machine 61 does not have the F-code function, the facsimile machine 61 can perform the control of FIG. 8. In correspondence with the operation of the facsimile machine 61, the present facsimile machine 1 can perform the information transmission procedure of S300–S332 of FIG. 9.

<Third Embodiment>

Next, a facsimile machine according to a third embodiment will be described while referring to FIGS. 2(c), 7, 8, and 10.

The present embodiment in directed to the case where the remote facsimile machine 61 is not provided with the F-code function. According to the present embodiment, even when the remote facsimile machine 61 accesses the facsimile machine 1 using the normal-polling facsimile procedure, the facsimile machine 1 can prevent occurrence of communication error that may leave the remote user not knowing the reasons of the error. Instead, the present facsimile machine 1 informs the user that the user may not access information of the facsimile machine 1 unless the user's facsimile machine 61 can designate the information with using selective polling (SEP) commands of the F-code function. Afterwardly, the facsimile machine will disconnect the connection with the remote facsimile machine 61.

Figure 2C:
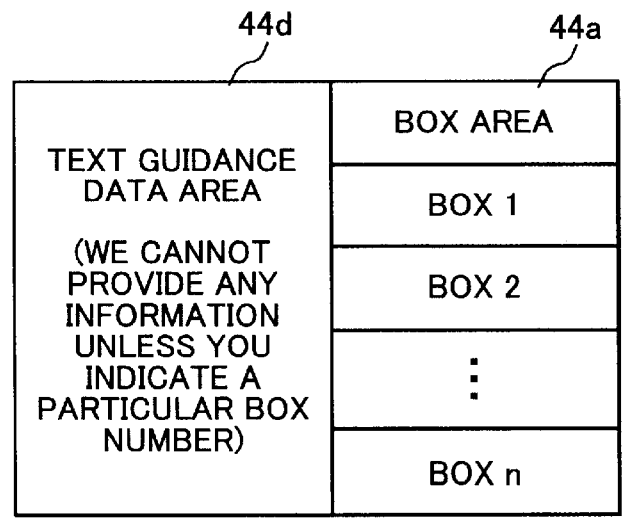
FIG. 2(c) is a schematic view showing a memory content of the RAM 44 according to a third embodiment.

The facsimile machine 1 according to the present embodiment in the same as that of the facsimile machine 1 of the first embodiment except that the RAM 44 has a memory content shown in FIG. 2(c) and that the facsimile machine 1 executes the facsimile communication routine of S300 as shown in FIG. 10. The facsimile communication routine of S300 of the present embodiment is the same as that of the first embodiment (FIG. 6(a)) except that processes of S320–S332 are added.

As shown in FIG. 2(c), the RAM 44 has two storage areas: a box area 44a and a text guidance data area 44d. The box area 44a has the same configuration as that of the first embodiment. The text guidance data area 44d stores text guidance data indicating that information can not be retrieved from the facsimile machine 1. Examples of the text guidance data are: data of a written message reading "we can not provide any information unless you indicate a particular box number"; and data of another written message reading "you can not designate information unless your facsimile machine is capable of performing F-code function".

Figure 7:
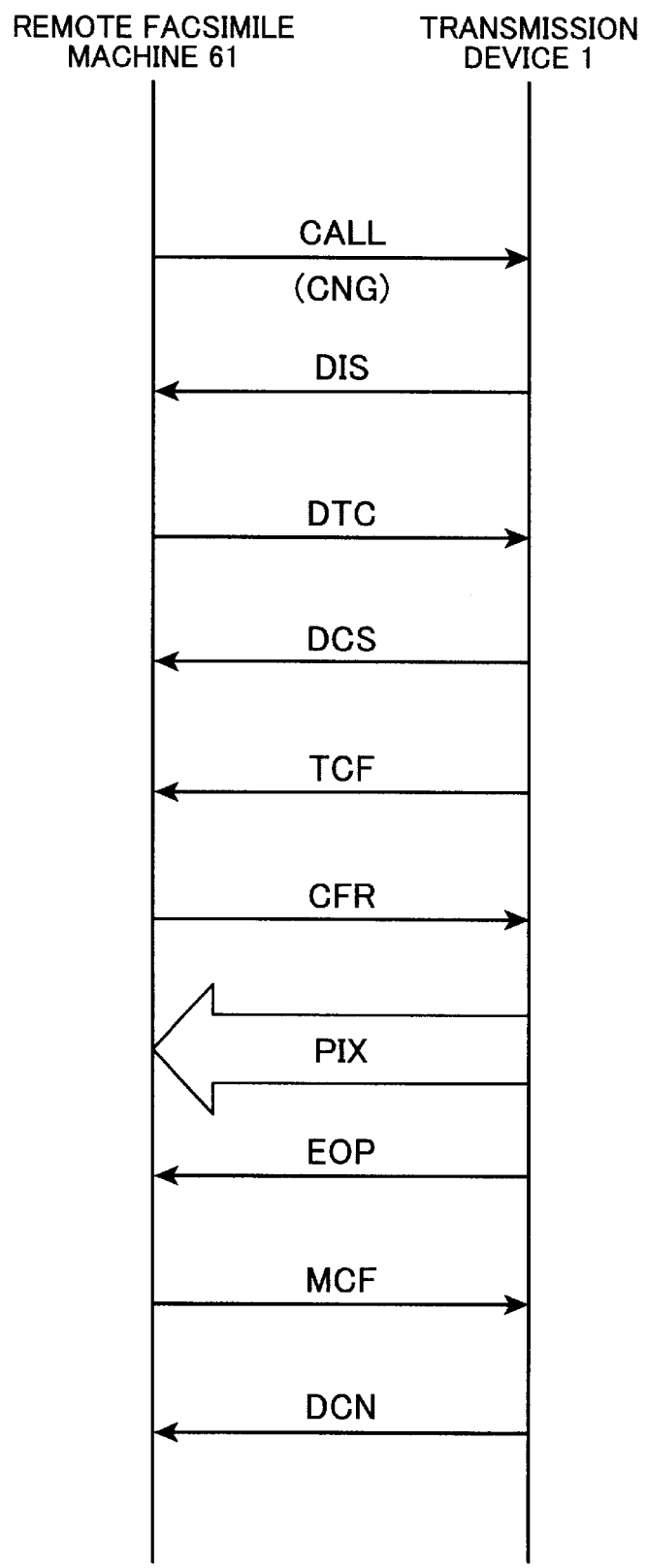
FIG. 7 is a schematic view showing transmission procedures performed between the facsimile machine 1 and the remote facsimile machine 61 when the remote facsimile machine 61 accesses the facsimile machine 1 via a facsimile transmission procedure without using F-code function according to a second embodiment.
Figure 8:
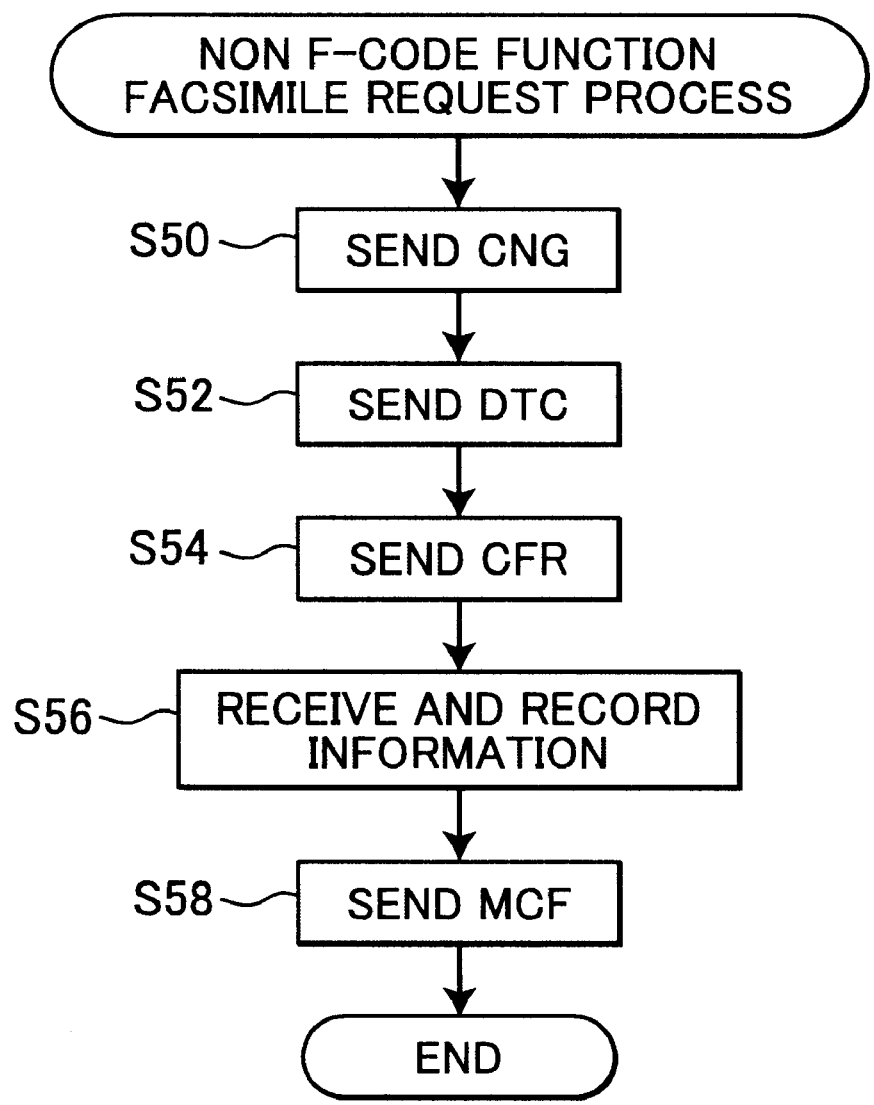
FIG. 8 is a flowchart representing a non F-code function facsimile request process executed by the remote facsimile machine 61 in order to access the facsimile machine 1 via a facsimile procedure without using the F-code function.

Because the remote facsimile machine 61 does not have the F-code function, when the remote user attempts to access the present facsimile machine 1 during the normal-polling facsimile procedure, the remote facsimile machine 61 executes the non F-code facsimile request process as shown in FIGS. 7 and 8 in the same manner as described for the second embodiment except that the facsimile machine 61 will receive and record in S56 text guidance information retrieved and transmitted from the text guidance data area 44d of the facsimile machine 1.

Because the remote facsimile machine 61 thus accesses the present facsimile machine 1 via facsimile communication, the present facsimile machine 1 receives a CNG signal indicating that this access is according to a facsimile procedure (yes in S100 and S200 in FIG. 5). Accordingly, the facsimile machine 1 performs the facsimile communication routine of S300 as shown in FIG. 10.

During the facsimile transmission routine of S300, as shown in FIG. 10, the facsimile machine 1 operates as described below.

Because the remote facsimile machine 61 does not have the F-code function, even if the user of the remote facsimile machine 61 attempts to designate box number, the facsimile machine 61 transmits only a DTC signal in S52 (FIG. 8) through the normal-polling procedure, but will not transmit a SEP signal. Accordingly, in S304, the CPU 40 will judge that no SEP signal has been received (S304:NO), and the program proceeds to S320. The CPU 40 then transmits a DCS signal in S320 and a TCF signal in S322. When the CPU 40 receives a CFR signal (S324:YES), then in S325, the CPU 40 retrieves text guidance data from the text guidance data area 44d and transmits the text guidance data to the remote facsimile machine 61. The remote facsimile machine 61 will record the transmitted information in S56. The user of the remote facsimile machine 61 then views the recorded data and learns that he or she can not retrieve information without indicating a box number. In other words, the user learns that he or she can not retrieve information because his or her facsimile machine is not provided with the F-code function.

When completing the information transmission, the CPU 40 then transmits an EOP signal indicating that transmission of guidance data is completed in S328. When the CPU 40 receives an MCF signal from the facsimile machine 61 in S330, then the CPU 40 transmits a DCN signal in S332.

As described above, the facsimile machine 1 of the third embodiment can advise the user of the remote facsimile machine that he or she can not retrieve information from the facsimile machine 1 without designating a box number when the facsimile machine 1 receives a request from the remote facsimile machine 61 that is not provided with the F-code function. The facsimile machine 1 prevents occurrence of communication errors that may leave the remote user not knowing why the communication has been failed.

Thus, according to the present embodiment, when the remote device 61 does not have a function to request image information transmission according to the predetermined selective-polling procedure, the facsimile machine 1 can inform the remote device 61 that the remote device 61 can not obtain information without that function. The user at the remote device 61 can then know why he/she may not obtain information from the facsimile machine 1.

Thus, according to the second and third embodiments, if the remote facsimile machine 61, that has no F-code function, accesses the facsimile machine 1 via the facsimile communication process, the facsimile machine 61 may not obtain information from the device 1. However, the user at the facsimile machine 61 can know what information is stored in the device 1 or the fact that information may not be obtained without using the F-code function.

While the invention has been described in detail with reference to the specific embodiments thereof, it would be apparent to those skilled in the art that various changes and modifications may be made therein without departing from the spirit of the invention.

For example, in the embodiments described above, the information transmission control routines represented by the flowcharts in FIGS. 5, 6(a), 6(b), 9, and 10 are executed by the CPU 40 of the facsimile device 1. However, the information transmission routines can be executed by a CPU 64a of the, personal computer 64. More specifically, data of a computer program for executing the information transmission routines of FIGS. 5, 6(a), 6(b), 9, and 10 can be initially stored in a CD-ROM or floppy disk 80. The computer program is then read from the CD-ROM or floppy disk 80 by a drive mechanism 64c provided to the personal computer 64, and is installed in a hard disk drive 64b. The CPU 64a executes the computer program thus installed in the hard disk drive 64b.

Thus, the information transmission operation of the present invention may be executed by the CPU 40 mounted in the facsimile machine 1 or may be executed by the computer 64 connected to the facsimile machine 1. An information transmission device can therefore be realized in both cases when the facsimile machine 1 is mounted with a data storage medium in the form of the ROM 43 and when the computer 64 connected to the facsimile machine 1 is installed with a computer program that is originally stored in the data storage medium such as the floppy disk 80.

What is claimed is:

1. An image information transmission device, comprising:
   storage means for storing image information, the storage means includes,
   first storage means for storing a plurality of sets of image information and data specifying each set of image information; and
   second storage means for storing information of a content of the first storage means;
   receiving means for receiving a request signal from a remote communication device;
   first judging means for judging whether the request signal is transmitted according to a facsimile communication process or according to a telephone communication process;
   first transmission means for, when the request signal is according to the facsimile communication process, retrieving image information, corresponding to the request signal, from the storing means and for transmitting the image information to the remote communication device, and the first transmission means includes;
   second judging means for judging whether the received request signal indicates a transmission request for requesting transmission of a designated set of image information according to a predetermined facsimile communication procedure;
   third transmission means for, when the request signal indicates a transmission request for requesting transmission of the designated image information according to the predetermined facsimile communication procedure, retrieving the set of image information, corresponding to the request signal, from the first storage means and transmitting the retrieved image information set to the remote communication device; and fourth transmission means for, when the request signal indicates no transmission request for requesting transmission of the designated image information according to the predetermined facsimile communication procedure, retrieving the content information from the second storage means and transmitting the content information to the remote communication device; and second transmission means for, when the request signal is according to the telephone communication process, retrieving image information, corresponding to the request signal, from the storing means and for transmitting the image information to the remote communication device.

2. An image information transmission device as claimed in claim 1, wherein the request signal according to the facsimile communication process includes a selective polling signal indicative of desired image information, and the request signal according to the telephone communication process includes a dial signal indicative of desired image information.

3. An image information transmission device as claimed in claim 1, wherein the first judging means judges whether or not the request signal includes a calling tone signal, the first judging means determining that the request signal is according to the facsimile communication process when the request signal includes a calling tone signal, the first judging means determining that the request signal is according to the telephone communication process when the request signal includes no calling tone signal.

4. An image information transmission device as claimed in claim 3, wherein the second transmission means includes:

verbal guidance means for supplying, when the first judging means determines that the request signal is according to the telephone communication process, verbal guidance information to the remote communication device, the verbal guidance information indicating a manner how to designate desired image information, thereby allowing the remote communication device to designate the desired image information and to transmit a designation signal indicative of the designated image information; and means for retrieving image information, designated by the designation signal, from the storing means and for transmitting the retrieved image information to the remote communication device.

5. An image information transmission device as claimed in claim 4, wherein the designation signal is a dial signal indicative of the designated image information.

6. An image information transmission device as claimed in claim 5, wherein the designation signal is a DTMF signal.

7. An image information transmission device as claimed in claim 1, wherein the first judging means judges whether the request signal is according to the facsimile communication process or to the telephone communication process by judging whether or not a predetermined signal is transmitted from the remote communication device.

8. An image information transmission device as claimed in claim 7, wherein the predetermined signal is a calling tone signal.

9. An image information transmission device as claimed in claim 1, wherein the second judging means judges whether or not the request signal includes a selective polling signal, wherein when the request signal includes a selective polling signal, the third transmission means retrieves the set of image information designated by the selective polling signal from the first storage means and transmits the retrieved image information set to the remote communication device, and wherein when the request signal includes no selective polling signal, the fourth transmission means retrieves the content information from the second storage means and transmits the content information to the remote communication device.

10. An image information transmission device, comprising:

storage means for storing image information;

receiving means for receiving a request signal from a remote communication device;

first judging means for judging whether the request signal is transmitted according to a facsimile communication process or according to a telephone communication process;

first transmission means for, when the request signal is according to the facsimile communication process, retrieving image information, corresponding to the request signal, from the storing means and for transmitting the image information to the remote communication device; and second transmission means for, when the request signal is according to the telephone communication process, retrieving image information, corresponding to the request signal, from the storing means and for transmitting the image information to the remote communication device, wherein the first transmission means includes third judging means for judging whether the received request signal indicates a transmission request for requesting transmission of image information according to a predetermined facsimile communication procedure;

fifth transmission means for, when the request signal indicates a transmission request for requesting transmission of image information according to the predetermined facsimile communication procedure, retrieving the image information from the storing means and transmitting the retrieved image information to the remote communication device; and sixth transmission means for, when the request signal indicates no transmission request for requesting transmission of the image information according to the predetermined facsimile communication procedure, transmitting information indicative of the judged result to the remote communication device.

11. An image information transmission device as claimed in claim 10, wherein the storing means further stores data of a message corresponding to the result judged by the third judging means when the request signal indicates no transmission request for requesting transmission of image information according to the predetermined facsimile communication procedure, the sixth transmission means retrieving the message data and transmitting the message data to the remote communication device.

12. An image information transmission device as claimed in claim 11, wherein the third judging means judges whether or not the request signal includes a selective polling signal, wherein when the request signal includes a selective polling signal, the fifth transmission means retrieves image information, designated by the selective polling signal, from the storing means and transmits the retrieved image information to the remote communication device, wherein when the request signal includes no selective polling signal, the sixth transmission means retrieves the message data from the storing means and transmits the message data to the remote communication device.

13. A data storage medium for storing a computer program for controlling an image information transmission device, which has a storage portion storing image information, to transmit the image information to a remote communication device in response to a request signal transmitted therefrom, the storage portion includes a first storage portion for storing a plurality of sets of image information and data specifying each set of image information and data specifying each set of image information; and a second storage portion for storing information of a content of the first storage portion, the computer program comprising:

a judging computer program of judging, upon receipt of a request signal transmitted from a remote communication device, whether the request signal is transmitted according to a facsimile communication process or according to a telephone communication process;

a first transmission computer program of, when the request signal is according to the facsimile communication process, retrieving image information, corresponding to the request signal, from the storage portion and transmitting the image information to the remote communication device, and the first transmission computer program includes:

second judging computer program of judging whether the received request signal indicates a transmission request for requesting transmission of a designated set of image information according to a predetermined facsimile communication procedure;

third transmission computer program of when the request signal indicates a transmission request for requesting transmission of the designated image information according to the predetermined facsimile communication procedure, retrieving the set of image information, corresponding to the request signal, from the first storage portion and transmitting the retrieved image information set to the remote communication device; and fourth transmission computer program of when the request signal indicates no transmission request for requesting transmission of the designated image information according to the predetermined facsimile communication procedure, retrieving the content information from the second storage portion and transmitting the content information to the remote communication device;

a second transmission computer program of, when the request signal is according to the telephone communication process, retrieving image information, corresponding to the request signal, from the storage portion and transmitting the image information to the remote communication device.

14. A data storage medium as claimed in claim 13, wherein the judging computer program judges whether or not the request signal includes a calling tone signal, the judging computer program determining that the request signal is according to the facsimile codification process when the request signal includes a calling tone signal, the judging computer program determining that the request signal is according to the telephone communication process when the request signal includes no calling tone signal, and wherein the second transmission computer program includes:

a program of supplying, when the judging computer program determines that the request signal is according to the telephone communication process, verbal guidance information to the remote communication device, the verbal guidance information indicating a manner how to designate desired image information, thereby allowing the remote communication device to designate the desired image information and to transmit a designation signal indicative of the designated image information; and a program of retrieving image information, designated by the designation signal, from the storage portion and for transmitting the retrieved image information to the remote communication device.

* * * * *